United States Patent [19]

Driver et al.

[11] Patent Number: 5,737,822
[45] Date of Patent: *Apr. 14, 1998

[54] CORPORATION STOP ASSEMBLY

[75] Inventors: Franklin T. Driver, St. Charles; Joseph D. Carroll, Lake St. Louis, both of Mo.

[73] Assignee: Insituform (Netherlands) B.V., Netherlands

[ * ] Notice: The term of this patent shall not extend beyond the expiration date of Pat. No. 5,655,283.

[21] Appl. No.: 534,045

[22] Filed: Sep. 26, 1995

Related U.S. Application Data

[63] Continuation-in-part of Ser. No. 489,492, Jun. 12, 1995, Pat. No. 5,655,283.

[51] Int. Cl.⁶ .................................................. B21D 39/00
[52] U.S. Cl. ................................ 29/450; 29/512; 29/523; 285/222
[58] Field of Search ........................... 29/506, 507, 523, 29/512, 237, 282, 890.148, 450; 285/196, 197, 208, 222

[56] References Cited

U.S. PATENT DOCUMENTS

| | | |
|---|---|---|
| 614,547 | 11/1898 | Haworth . |
| 633,537 | 9/1899 | Stewart . |
| 1,307,755 | 6/1919 | Ross . |
| 2,021,176 | 11/1935 | Curtis . |
| 3,333,724 | 8/1967 | Croft et al. . |
| 3,613,936 | 10/1971 | Kaiser et al. . |
| 3,694,009 | 9/1972 | Phillips . |
| 3,730,565 | 5/1973 | Steudler, Jr. . |
| 3,756,261 | 9/1973 | Minchhoff .................. 29/523 |
| 3,841,667 | 10/1974 | Sands .......................... 285/222 |
| 4,303,101 | 12/1981 | Tholen . |
| 4,411,458 | 10/1983 | Strunk et al. . |
| 4,509,243 | 4/1985 | Schneider et al. . |
| 4,634,307 | 1/1987 | Gnaedinger et al. . |
| 4,654,942 | 4/1987 | Rush et al. . |
| 5,199,145 | 4/1993 | McMillan et al. . |

FOREIGN PATENT DOCUMENTS

| | | |
|---|---|---|
| 599652 | 1/1926 | France ............................ 285/222 |
| 6410074 | 3/1966 | Netherlands ..................... 285/222 |
| 23414 | of 1908 | United Kingdom ............. 285/222 |
| 30022 | of 1911 | United Kingdom ............. 285/222 |

OTHER PUBLICATIONS

Mueller Co. brochure: Drilling and Tapping Machines, 1991.

Primary Examiner—David P. Bryant
Attorney, Agent, or Firm—Cowan, Liebowitz & Latman, P.C.; Michael I. Wolfson

[57] ABSTRACT

A corporation stop for use with standard tapping equipment includes a threaded stem with an enlarged, conical head for forming a blind side seal. A resilient sleeve member coaxially surrounds a narrow portion of the stem, and a flat compression ring rests coaxially above the sleeve member and has a notch formed radially in its outer edge. A standard saddle having a radially-inward tab is placed on the external sidewall of the conduit about the opening and receives the compression ring, the tab engaging the notch in the compression ring. A clamp nut is engaged with the threaded stem, forcing the compression ring against the resilient sleeve member to forcibly move the upper end of the sleeve member towards the compression ring to form an external seal between the compression ring and the external sidewall of the conduit and force the sleeve member over the enlarged, conical head of the threaded stem to form an internal seal within the lined conduit. The stem, saddle member and compression ring engage each other to prevent relative rotation.

20 Claims, 4 Drawing Sheets

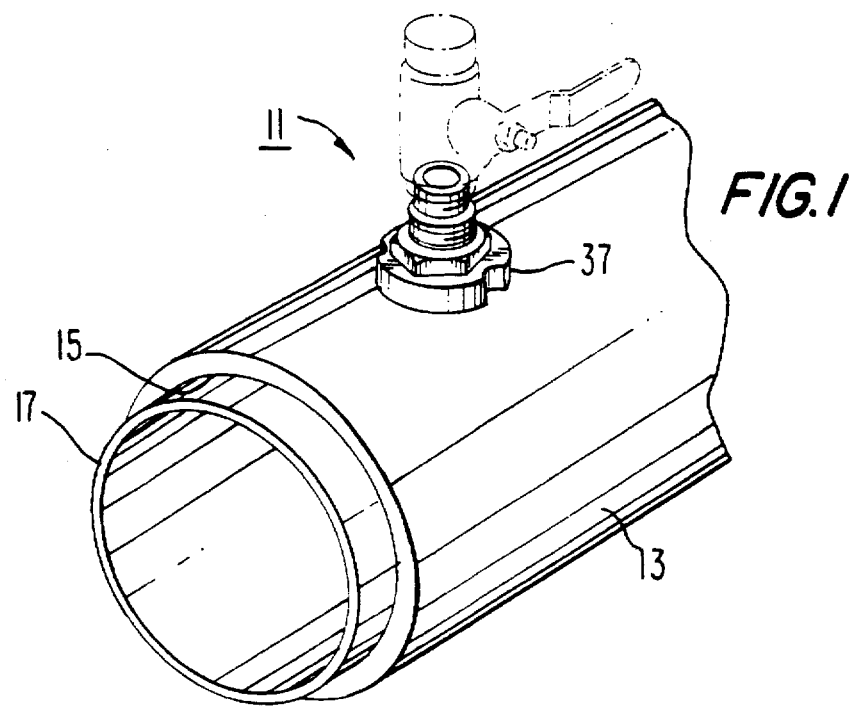
FIG. 1
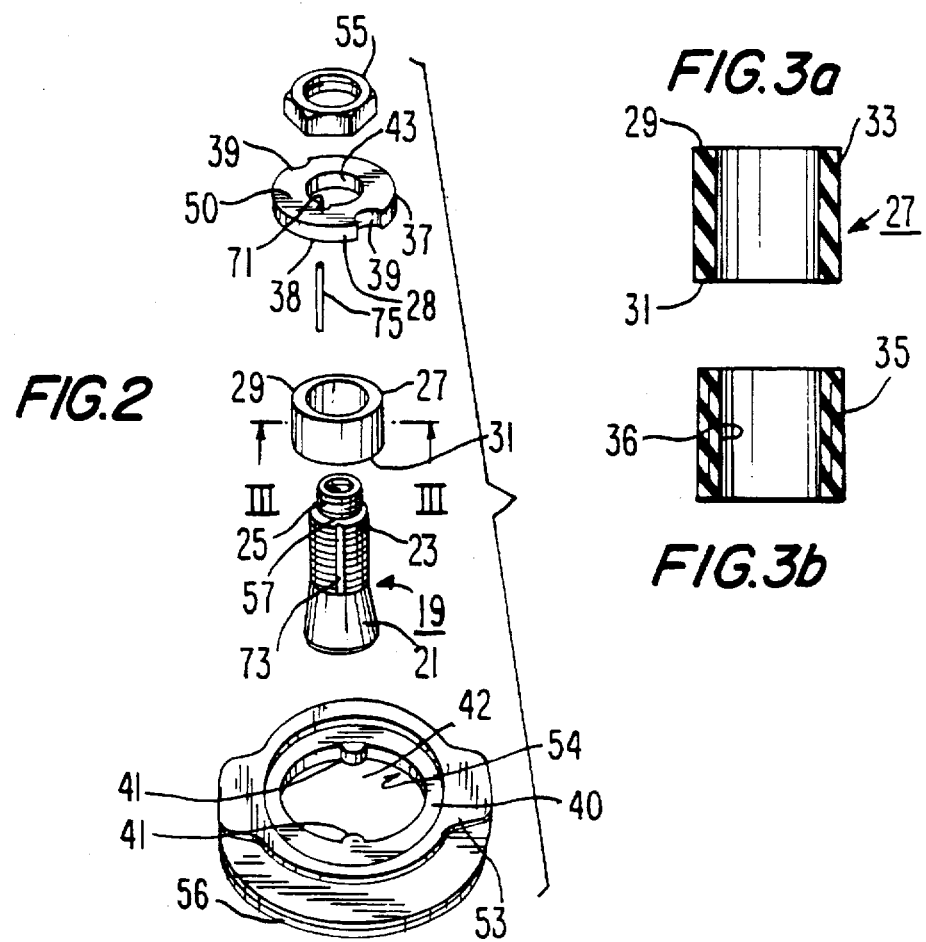
FIG. 2
FIG. 3a
FIG. 3b

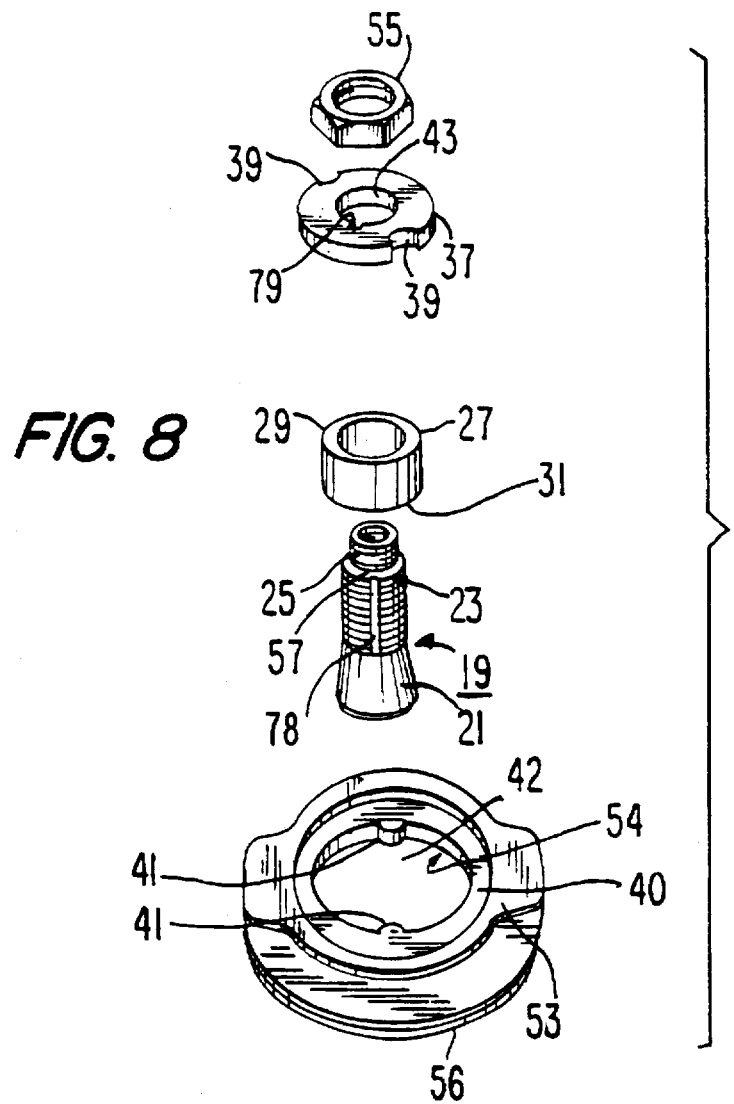

CORPORATION STOP ASSEMBLY

CROSS-REFERENCE TO RELATED APPLICATIONS

This application is a continuation-in-part of application Ser. No. 08/489,492, filed Jun. 12, 1995, now U.S. Pat. No. 5,655,283.

BACKGROUND OF THE INVENTION

The invention relates to a corporation stop of the type adapted to be installed in the sidewall of a fluid bearing conduit to form a junction or branch and, specifically, to such a stop that is adapted for installation within a lined conduit using standard drilling and tapping machines.

A variety of circumstances exist in which it is desirable to form a junction or branch line from a main, fluid carrying conduit. For instance, in the municipal area, it is often necessary to install a branch line into a water main, gas main or sewer main. A similar need exists in other industries, such as in the chemical pipeline industries.

In the municipal area, many water mains were constructed years ago and the wall structures are now badly eroded or collapsing. In order to repair such damage, it has been proposed to insert a liner within these lines to provide a new water-impervious wall to the system. There are various different methods available in the industry for inserting synthetic liners within existing conduits, such as the cured-in-place, fold-and-form and diameter reduction methods, each of which inserts a liner from one end of the conduit to the other. However, the wall of the line is usually not continuous since branch lines intersect the main conduit at various entry ports to allow the free flow of fluid from the main to the branch line. In the case of existing and newly formed entry ports, it is desirable to utilize a corporation stop at the junction to control the fluid on either a temporary or a permanent basis.

Although a variety of corporation stops are known in the prior art, all suffer from various deficiencies. Many of the prior art assemblies are complicated in design and are time consuming to install. In many cases, it was not possible to install the stop on a "live" line that was carrying fluid under pressure. Although standardized machinery has been developed for installing corporation stops in conduits carrying fluid under pressure, such as the B-101 drilling and tapping machines manufactured by Mueller Co., this machinery is not well suited for use with a conduit that has been lined or rehabilitated with a synthetic liner.

The prior art corporation stop assembly that is specifically designed for installation in a conduit that is lined with a synthetic liner is disclosed in U.S. Pat. No. 5,199,145 (McMillan et al.). The corporation stop assembly disclosed therein has a flexible sleeve member and a threaded stem with an enlarged head portion, and is installed into the lined conduit by way of a clamp nut that engages the neck portion of the threaded stem for forcibly moving the lower end of the sleeve member over the head portion of the stem to expand the lower end of the sleeve member and form an internal seal with an opening in the conduit. The McMillan patent also discloses a specific apparatus to be used for installing that corporation stop in a live, pre-lined conduit carrying fluid under pressure.

While this corporation stop is effective for use in lined conduits carrying therein fluid under pressure, the apparatus shown in the McMillan patent for installing the corporation stop in a lined conduit is fairly large and unwieldy and may not be suitable for situations in which the space available along the conduit adjacent the spot for installation of the corporation stop is less than the amount of space physically required by the disclosed installation apparatus. Furthermore, the McMillan patent shows no way in which the corporation stop disclosed therein can be installed using standard drilling and tapping equipment, such as the Mueller B-101 machine for drilling, tapping and installing corporation stops in unlined conduits, and others manufactured by ALH and Wask, which are well known to those skilled in the art.

SUMMARY OF THE INVENTION

Generally speaking, in accordance with the invention, a corporation stop for use with standard drilling and tapping machinery is provided for blind side sealing of an opening that is made in an external sidewall of a longitudinally extending conduit of the type lined with a synthetic liner also having a concentric opening. The corporation stop has a threaded stem with an enlarged, conical head portion and a neck portion of reduced size. A resilient sleeve member coaxially surrounds the neck portion of the stem and has an upper end and a lower end that is adapted to accommodate the enlarged, conical head of the threaded stem. A flat, annular compression ring, whose opening is aligned with the opening provided through the sidewall of the conduit and the liner, rests above the sleeve member and has at least one notch formed radially in its outer edge. The lower side of the compression ring has a sleeve-receiving recess of a diameter greater than that of the annular opening, the diameter of said recess being selectively sized to receive the upper end of the resilient sleeve member. The corporation stop also has a clamp nut that is engageable with the neck portion of the threaded stem. A saddle member for stabilizing the standard drilling and tapping machine is placed on the external sidewall of the conduit about the proposed opening. The saddle member has an annular opening shaped to receive the compression ring within it and the inner edge of the opening has at least one tab projecting radially and shaped to engage the notch in the compression ring.

To install the corporation stop, the clamp nut is first engaged with the neck portion of the threaded stem. This forces the compression ring against the resilient sleeve member so as (1) to forcibly move the upper end of the resilient sleeve member within the sleeve-receiving recess of the compression ring to form an external seal between the compression ring and the external sidewall of the conduit, and (2) to forcibly move the lower end of the resilient sleeve member over the enlarged, conical head portion of the threaded stem to thereby expand the lower end of the sleeve member and form an internal seal with the opening in the lined conduit.

Accordingly, it is desirable to provide an improved corporation stop which overcomes the shortcomings of the prior art and is easily installed with conventional tapping equipment. It is an object of the invention to provide a corporation stop for a pre-lined fluid-carrying conduit which allows blind side installation by cutting a hole straight through the conduit from the exterior.

Another object of the invention is to provide such a stop which seals on both the interior and exterior sidewalls of the fluid-carrying conduit.

Still another object of the invention is to provide a stop which more securely engages a previously installed synthetic liner within a conduit to eliminate any annular gaps which might be present between the liner and host conduit.

Yet another object of the invention is to provide a sealing element for the corporation stop which is linearly and radially reinforced to resist shear forces during installation and reduce the chances of a blowout during the operational life of the stop.

A further object of the invention is to provide a corporation stop for a pre-lined conduit carrying fluid under pressure utilizing standard drilling and tapping equipment.

Yet a further object of the invention is to provide a method of installation of the corporation stop.

Still other objects and advantages of the invention will in part be obvious and will in part be apparent from the specification.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in conjunction with the following accompanying drawings, in which:

FIG. 1 is a perspective view of a segment of a fluid-carrying conduit having a corporation stop constructed and arranged in accordance with the invention installed thereon with a pipe coupling being shown in phantom;

FIG. 2 is an isolated, exploded view of the corporation stop assembly in accordance with the invention;

FIG. 3a is a sectional view of a first embodiment of the resilient sleeve sealing element of the stop of FIGS. 1 and 2;

FIG. 3b is a sectional view of resilient sleeve member that is radially and linearly reinforced with metallic belting in accordance with another embodiment of the invention;

FIG. 8 is an isolated, exploded view of the corporation stop assembly according to a second embodiment of the invention.

DETAILED DESCRIPTION OF THE INVENTION

Figure 4:
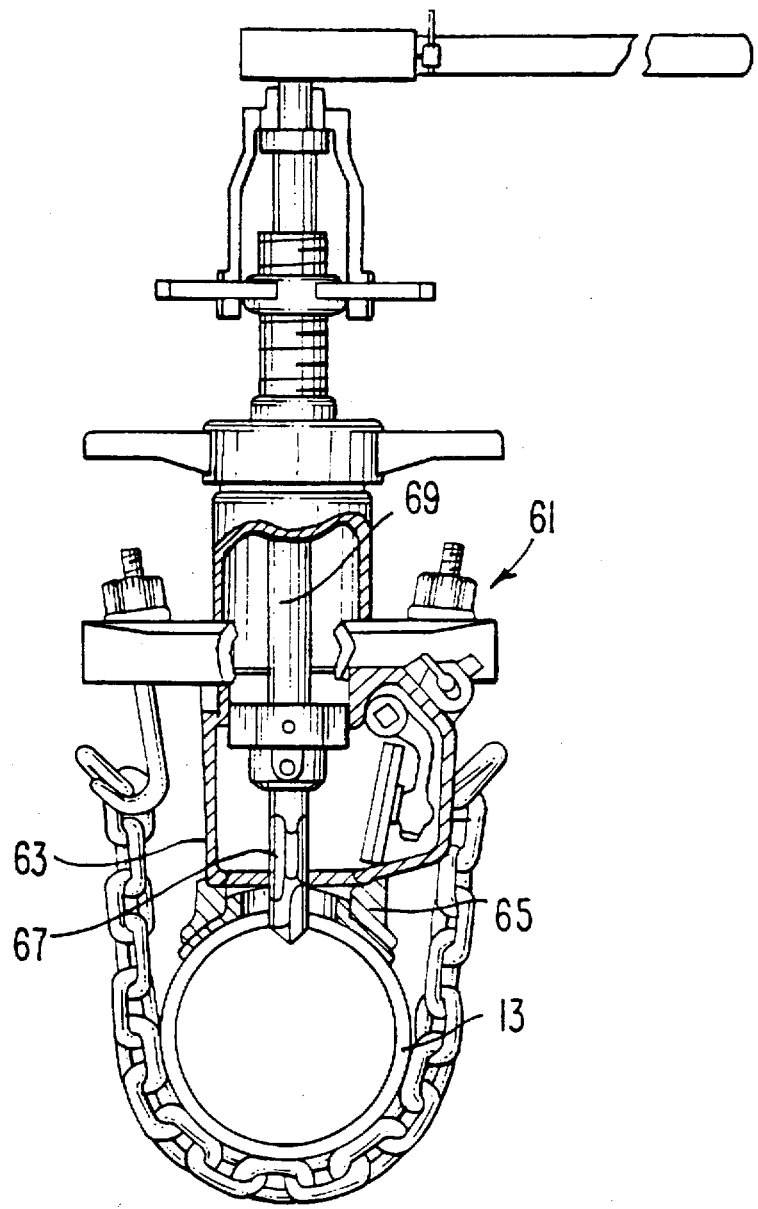
FIG. 4 is a partial sectional side elevational view of a standard, prior art drilling, tapping and stop-installing machine.

FIG. 1 shows a corporation stop constructed and arranged in accordance with the invention, designated generally as 11, installed on a longitudinally extending host conduit 13. Host conduit or pipe 13 could be, for instance, a water main, gas main, sewer pipe, or the like. In this case, pipe 13 is of steel and has a generally cylindrical interior sidewall 15 which has been lined with a synthetic liner 17 formed from a cured in place liner or polyolefin, e.g. polyethylene.

A well-known process for rehabilitation of existing conduits generally utilizing a flexible liner to be cured in place is the "Insituform®" method described in U.S. Pat. Nos. 4,009,063 and 4,064,211, the contents of which are incorporated herein by reference. Another rehabilitation process known as the "NuPipe®" process is described in U.S. Pat. No. 4,867,921 and No. 5,255,624, the contents of which are incorporated here by reference. In this latter process a substantially rigid replacement pipe is installed in a flattened and folded shape, heated and expanded to the shape of the original conduit. Another process for lining conduits familiar to those skilled in the art is diameter reduction, which is described in U.S. Pat. No. 4,923,663, issued to McMillan.

FIG. 2 shows corporation stop 11 in exploded fashion. Corporation stop 11 includes a stem 19 having an external thread and optionally an internal thread. In sequential relation stop 11 includes an enlarged, conically-shaped head portion 21 and a neck portion 23 of reduced size. Neck portion 23 terminates in an extension portion 25 that passes through an outer compression ring 37 having an inner bore 43 and an outer clamp nut 55.

A resilient sleeve member 27 formed of a flexible, elastomeric material is received about neck portion 23 of stem 19. Sleeve member 27 has an upper end 29 and has a lower end 31 that is adapted to accommodate enlarged head portion 21 of threaded stem 19 during assembly. As shown in FIGS. 3a and 3b, sleeve member 27 can conveniently be provided as a generally cylindrical body 33 that can be linearly and radially reinforced, as with steel belting 35 shown in FIG. 3b. Steel belting 35 is encapsulated within the sidewalls of body 33, circumscribing internal bore 36.

Compression member 37 has a central opening 43 (FIGS. 2 and 5) which is alignable with opening 45 provided in the sidewall of conduit 13. Central opening 43 is formed with a keyway 71 for receiving a key 75 to prevent stem 19 from rotating relative to compression ring 37 during assembly. Lower side 38 of compression member 37 is provided with a recess 47 for receiving upper end 29 of sleeve member 27 when stop 11 is installed within host conduit 13 for forming an external seal with respect to the conduit. The seal is illustrated at approximately 49 in FIG. 6.

As shown in FIG. 2, extension portion 25 of stem 29 is of lesser relative diameter than neck portion 23, thereby forming a step 57 with respect to neck portion 23. Extension portion 25 is selectively sized to matingly engage the iron pipe thread of a pipe coupling installed on the exterior of the conduit 13 during a later step in the installation. Neck portion 23 of stem 19 is formed with a keyway 73 for receiving key 75 to prevent stem 19 from rotating relative to compression ring 37 during assembly.

In an alternative embodiment for preventing stem 19 from turning relative to compression ring 37, shown as FIG. 8, stem 19 is formed with a lengthwise groove 78, similar to keyway 73. However, instead of keyway 71, compression ring 37 is formed with a tab 79 that protrudes radially from its inner edge into inner bore 43 and that is dimensioned to mate with groove 78 in stem 19. Mating of tab 79 and groove 78 allows stem 19 to move axially through compression ring 37 but prevents stem 19 from rotating relative to compression ring 37 during assembly.

Clamp nut 55 is engageable with neck portion 23 of threaded stem 19 for forcibly moving lower end 31 of resilient sleeve member 27 over conical head portion 21 of threaded stem 19 to expand lower end 31 of sleeve member 27 and form an internal seal with opening 45 in lined conduit 13.

Corporation stop 11 is, until this point, similar to that disclosed in the McMillan patent. However, instead of having an enlarged compression washer contoured to match the outside curvature of conduit 13, corporation stop 11 has a modified smaller compression ring 37 (FIG. 2) that has at least one, but preferably two, radial notches 39 formed into outer edge 28. Compression ring 37 has a central opening 43 (FIGS. 2 and 5) that is alignable with opening 45 cut through the sidewall of conduit 13. The upper surface of compression ring 37 has a generally planar surface for receiving clamp nut 55. Compression ring 37 or the bottom surface thereof can be contoured to match the curvature of the external sidewall of host conduit 13.

Corporation stop assembly 11 also includes a saddle 53, which is preferably formed of cast iron. Saddles are generally known in the art and are formed so that a conventional drilling and tapping machine can be held in place against the host conduit at a particular position on the surface pipe for installation of a corporation stop. Such saddles are available from Mueller Co. as well as from other manufacturers and are generally formed in flat, annular shape, having an outer diameter and an inner diameter (see FIG. 2). Preferably, such saddles have an inner annular rim 40 of intermediate height with an inner edge corresponding to that of the saddle and outer edge having a diameter greater than the inner diameter and less than the outer diameter of the saddle. Rim 40 enables easy placement of the drilling and tapping machine so that the machinery does not slip relative to pipe 13 or saddle 53 during operation. In addition, a rubber gasket 56 is placed under modified saddle 53 in order to help prevent leaking and slippage of saddle 53 during the tapping operation. In an alternative embodiment an insulating washer or gasket can be positioned between compression ring 37 and conduit 13. This can electrically isolate the fitting from the host conduit. A saddle is chosen for use on a particular conduit such that the curvature of the bottom surface of the saddle is contoured to match the curvature of the external sidewall of host conduit 13.

A standard Mueller saddle has been modified in accordance with the invention to form saddle 53 with a modified inner edge 54 of opening 42. Inner edge 54 has at least one, but preferably two, tabs 41 that protrude radially into opening 42 of saddle 53. Tabs 41 are formed as part of saddle 53 and are most preferably dimensioned to match the dimensions of notches 39 that are formed in outer edge 38 of compression ring 37. Opening 42 of saddle 53 is dimensioned so that the inner diameter is slightly larger than the diameter of compression ring 37, thereby allowing compression ring 37 to fit within opening 42 of saddle 53.

As discussed above, it is desirable to be able to use standard drilling and tapping machines for installation of corporation stop 11 into lined conduit 13. A Mueller B-101 drilling and tapping machine that is used with unlined conduits, well-known to those skilled in the art, is shown in FIG. 4. In normal operation, a standard Mueller drilling and tapping machine, generally designated 61, is equipped with a sealed valve 63 that is chained or strapped to host conduit 13, with a saddle 65 situated between conduit 13 and valve 63. A drilling and tapping head 67 is attached to the end of a boring bar 69 for drilling a hole through conduit 13 and for forming threads in the inner edges of the hole. The drilling and tapping head 67 is extracted and removed from boring bar 69, and the corporation stop is then attached to boring bar 69 and screwed into the hole.

A modified saddle 53, as discussed above, preferably with a rubber gasket 56 underneath it, is placed between conduit 13 and the valve of the drilling and tapping machine. Also, in forming an opening in a lined conduit, a drilling head cannot be used, as it will tend to tear synthetic liner 17. Rather, a hole saw must be used so as to cut, rather than drill, a hole 45 through both original host conduit 13 and synthetic liner 17 within.

Figure 5:
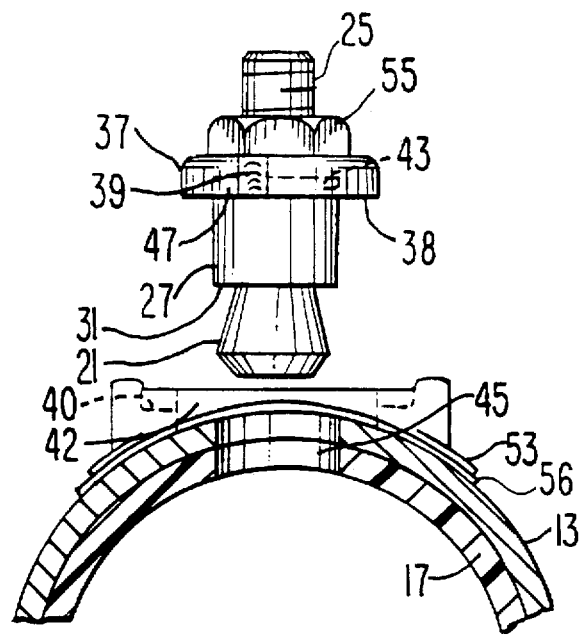
FIG. 5 is a partial cross-sectional view of the fluid-carrying conduit showing the stop about to be inserted into an opening previously provided in the lined conduit sidewall.
Figure 6:
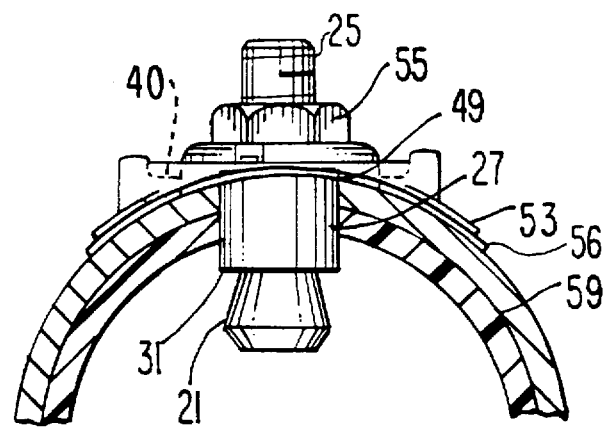
FIG. 6 is a view similar to FIG. 5 showing the engaged stop positioned within the opening previously provided in the lined conduit.
Figure 7:
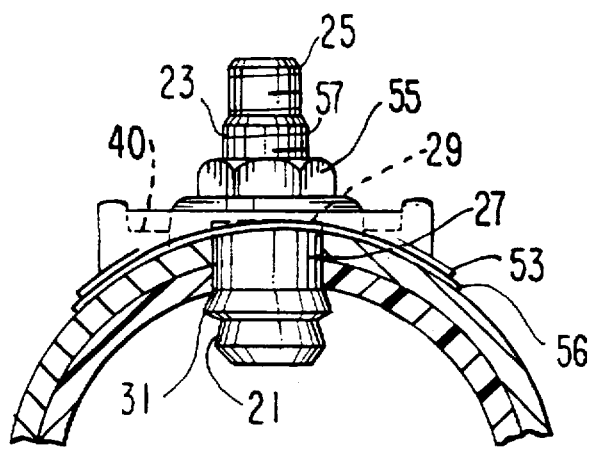
FIG. 7 is a view similar to FIG. 6 showing the corporation stop engaged in a sealed position within the lined, fluid-carrying conduit.

FIGS. 5-7 illustrate the installation of corporation stop 11 within an opening provided in host conduit 13. It should be noted that the components of stop 11 at this time are located within valve 63 of the Mueller drilling and tapping machine 61, which rests on annular rim 40 in the interior of saddle 53. FIGS. 5-7 show the installation of stop 11 and the movement of its components inside valve 63 after hole 45 has been cut through conduit 13 and liner 17 by Mueller machine 61.

FIG. 5 illustrates the relative arrangement of the components of stop 11 prior to installation within host conduit 13. Resilient sleeve member 27 is in the relaxed position disposed about stem 19. FIG. 6 shows corporation stop 11 after insertion, but prior to having been moved into sealing engagement with host conduit 13. Compression ring 37 has been placed within opening 42 of saddle 53, such that tabs 41 (not shown) of saddle 53 align with notches 39 of compression ring 37. Clamp nut 55 is threaded about the upper extent of neck portion 23 but has not been tightened fully. Lower end 31 of sleeve 27 has not been expanded over conical head portion 21 of threaded stem 19.

FIG. 7 shows the completed installation, which is accomplished by tightening clamp nut 55, preferably by using a deep socket or some other mechanism on the standard drilling and tapping mechanism. The socket will generally include a rubber insert with an opening for releasable holding neck portion 23 of threaded stem 19. As clamp nut 55 moves down neck portion 29 of threaded stem 19, enlarged head portion 21 is pulled upward and lower end 31 of sleeve 27 is flared outward, thereby engaging the opening in liner 17 and conduit 13, thereby clamping liner 17 to the internal sidewall of conduit 13 and eliminating any gaps which might be present in the annular region 49 between liner 17 and conduit 13. Compression ring 37 spreads the installation forces applied by clamp nut 55 over an area on the external sidewalls of the conduit. The resilient sleeve upper end 29 forms an external seal between the inner surface of compression ring 37 and external sidewalls of host conduit 13.

When clamp nut 55 is engaged with neck portion 23 of threaded stem 19 and turned, conical head portion 21 of threaded stem 19 is forced upwards into lower end 31 of sleeve member 27. Clamp nut 55 must be allowed to turn about threaded stem 19 without turning compression ring 37 as well. Slippage of either compression ring or saddle 53 will result in clamp nut 55 not being tightened sufficiently and a suitable seal not being formed. The apparatus of this invention does not include an enlarged washer as shown in the McMillan patent, which washer is contoured to fit against the outer surface of host pipe 13 so as to avoid slippage, because its size is incompatible with standard drilling and tapping machinery. Instead, stop 11 in accordance with the invention uses a mating connection between compression ring 37 and saddle 53. As discussed above, compression ring 37 is placed within opening 42 of saddle 53 such that notches 39 formed in the outer edges of compression ring 37 align with tabs 41 formed in inner edge 54 of opening 42 of saddle 53. When clamp nut 55 is turned about neck portion 23 of stem 19, clamp nut 55 will tend to frictionally pull compression ring 37 in the same direction as clamp nut 55 is being turned. At that point, tabs 41 on inner edge 54 of saddle 53 engage notches 39 on the outer edges of compression ring 37 and prevent compression ring 37 from being turned along with clamp nut 55.

When clamp nut 55 is turned about neck portion 23 of stem 19 and compression ring 37 is simultaneously restrained from turning relative to saddle 53, a situation may result in which clamp nut 55 ceases to turn about threaded neck 23 of stem 19 but rather frictionally pulls stem 19, in the same direction as clamp nut 55 is being turned. Slippage of stem 19 with respect to sleeve member 27 will result in a suitable seal not being formed. This situation is prevented in accordance with the invention by engaging stem 19, saddle 53 and compression ring 37 through a key/keyway arrangement, as shown in FIG. 2. Key 75 is engaged within keyway 71 in compression ring 37 and within keyway 73 in neck portion 23 of stem 19. Clamp nut 55 thus turns alone on stem 19 and pulls enlarged head 21 of threaded stem 19 upwards so as to expand sleeve member 27 and make a seal with opening 45 and stationary compression ring 37. Once clamp nut 55 has been tightened to a predetermined torque, the seal is effected and installation has been readily and efficiently accomplished.

In another embodiment in accordance with the invention, stem 19 is prevented from turning with respect to saddle 53 and compression ring 37 by a tab/groove arrangement as shown in FIG. 8. A tab 79 formed in the inner edge of inner bore 43 of compression ring 37 aligns with a lengthwise groove 78, which is similar to keyway 73, of stem 19. When clamp nut 55 is turned about neck portion 23 of stem 19, tab 79 on compression ring 37 engages groove 78 in stem 19 and prevents stem 19 from being turned along with clamp nut 55, but does not prevent stem 19 from moving axially with respect to compression ring 37. As stem 19 is pulled upward through inner bore 43, tab 79 moves axially on stem 19 within groove 78, thereby permitting axial movement of stem 19 while preventing rotation of stem 19.

After the seal has been made and corporation stop 11 has been installed, drilling and tapping machinery 61 is removed from stop 11. In addition, once installation machinery 61 has been unstrapped from conduit 13, saddle 53 and the rubber gasket underneath it may also be removed from around installed compression ring 37. An external view of installed corporation stop 11 (FIG. 1), after saddle 53 and the rubber gasket 56 have removed, shows upper end 29 of stem 19, clamp nut 55 and compression ring 37.

It will thus be seen that the objects set forth above, among those made apparent from the preceding description, are efficiently attained and, since certain changes may be made in carrying out the above process, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A corporation stop for use with a standard drilling and tapping machine for blind side sealing of an opening provided in an external sidewall of a longitudinally extending conduit of the type lined with a synthetic liner also having a concentric opening, the corporation stop comprising:

a threaded stem having an enlarged, conical head portion and a neck portion of reduced size;

a resilient sleeve member coaxially surrounding the neck portion of the stem, the sleeve member having an upper end and having a lower end adapted to accommodate the enlarged, conical head portion of the threaded stem;

a compression ring having an upper side, a lower side, an outer edge having at least one notch formed radially therein, and an opening that is alignable with the opening provided in the external sidewall of the conduit and in the liner, the lower side of the compression ring having a sleeve receiving recess of a diameter greater than that of said opening in said compression ring, said diameter of said recess being selectively sized to receive the upper end of said resilient sleeve member;

a clamp nut engageable with the neck portion of said threaded stem; and a saddle member for stabilizing said standard drilling and tapping machine on said external sidewall of said conduit about said opening, said saddle member having an opening shaped to receive said compression ring within said saddle member opening, said saddle member opening having an inner edge with at least one tab projecting radially from said inner edge and shaped to engage said at least one notch in said compression ring;

wherein, when said clamp nut is engaged with the neck portion of the threaded stem, said compression ring is forced against said resilient sleeve member (1) for forcibly moving the upper end of said resilient sleeve member within said sleeve receiving recess of said compression ring to form an external seal between the compression ring and the external sidewall of the conduit, and (2) for forcibly moving the lower end of said resilient sleeve member over the enlarged, conical head portion of the threaded stem to thereby expand the lower end of said sleeve member and form an internal seal with the opening in said lined conduit, and said at least one saddle member tab engages said at least one notch in said compression ring for preventing rotation of said compression ring relative to said saddle member as said clamp nut is engaged on said neck portion of said threaded stem.

2. The corporation stop of claim 1, wherein the resilient sleeve member is formed of an elastomeric material.

3. The corporation stop of claim 2, wherein the elastomeric material of said resilient sleeve member is linearly and radially reinforced.

4. The corporation stop of claim 1, wherein said threaded stem terminates in an extension portion that is engageable with an iron pipe thread formed on a pipe coupling of the type adapted to be installed on the exterior of said conduit, said extension portion of said threaded stem being of lesser relative diameter than the neck portion, thereby forming a step with respect to the neck portion, the extension portion being selectively sized to matingly engage said iron pipe thread of said pipe coupling when said pipe coupling is installed on the exterior of said conduit.

5. The corporation stop of claim 4, wherein said synthetic liner is a polyolefin liner.

6. The corporation stop of claim 4, wherein said synthetic liner is a cured-in-place liner.

7. The corporation stop of claim 4, wherein said synthetic liner is a folded-and-formed thermoplastic liner.

8. The corporation stop of claim 1, wherein said threaded stem includes an internal thread.

9. The corporation stop of claim 1, wherein said threaded stem and compression ring include engagement means for engaging the stem and compression ring to prevent relative rotation with respect to each other.

10. The corporation stop of claim 9, wherein said engagement means comprises a longitudinal keyway formed in each of said threaded stem and said compression ring alignable with each other and a key; and wherein said key is inserted into both said threaded stem keyway and said compression ring opening keyway when said threaded stem keyway and said compression ring opening keyway are aligned, for preventing rotation of said threaded stem relative to said compression ring when said clamp nut is engaged on said neck portion of said threaded stem.

11. The corporation stop of claim 9, wherein said engagement means comprises a longitudinal groove formed in said threaded stem and a tab formed in said compression ring projecting radially into said compression ring opening that is alignable with said groove of said threaded stem; and wherein said compression ring tab engages said longitudinal groove in said threaded stem for preventing rotation of said threaded stem relative to said compression ring and for allowing axial movement of said threaded stem through said opening of said compression ring when said clamp nut is engaged on said neck portion of said threaded stem.

12. The corporation stop of claim 1, further comprising insulating means between said compression ring and said external sidewall of said conduit for electrically insulating an electrical service line connected to the said drilling and tapping machine from the conduit.

13. The corporation stop of claim 12, wherein said insulating means is a gasket formed from a rubberized material.

14. A method for installing a corporation stop in an opening provided through an external sidewall of a longitudinally extending conduit lined with a synthetic liner using a standard drilling and tapping machine, said method comprising:

stabilizing said standard drilling and tapping machine on said external sidewall of said conduit about said opening using a saddle member;

providing a threaded stem having an enlarged, conical head portion and a neck portion of reduced size;

coaxially surrounding the neck portion of the stem with a resilient sleeve member having an upper end and having a lower end adapted to accommodate the enlarged, conical head portion of the threaded stem;

placing a compression ring about said neck portion of said threaded stem above said sleeve member, said compression ring having an upper side, a lower side, an outer edge having at least one notch formed radially therein and an opening that is alignable with the opening provided in the external sidewall of the conduit and in the liner, the lower side of the compression ring having a sleeve receiving recess of a diameter greater than that of said opening in said compression ring such that the upper end of said resilient sleeve member is received in said recess; and engaging a clamp nut to the neck portion of said threaded stem;

wherein said saddle member has an opening shaped to receive said compression ring within said saddle member opening, said saddle member opening having an inner edge with at least one tab projecting radially from said inner edge and shaped to engage said at least one notch in said compression ring;

such that, when said clamp nut is engaged with the neck portion of the threaded stem and said compression ring is inserted within said saddle member, and said clamp nut is tightened, said compression ring is forced against said resilient sleeve member (1) for forcibly moving the upper end of said resilient sleeve member within said sleeve receiving recess of said compression ring to form an external seal between the compression ring and the external sidewall of the conduit, and (2) for forcibly moving the lower end of said resilient sleeve member over the enlarged, conical head portion of the threaded stem to thereby expand the lower end of said sleeve member and form an internal seal with the opening in said lined conduit, and said at least one saddle member tab engages said at least one notch in said compression ring for preventing rotation of said compression ring relative to said saddle member as said clamp nut is engaged on said neck portion of said threaded stem.

15. The method of claim 14, further comprising:

forming a longitudinal keyway in said threaded stem;

forming a longitudinal keyway in said compression ring opening such that it is alignable with said threaded stem keyway; and inserting a key into both said threaded stem keyway and said compression ring opening keyway when said threaded stem keyway and said compression ring opening keyway are aligned, such that, when said clamp nut is engaged on said neck portion of said threaded stem, rotation of said threaded stem relative to said compression ring is prevented.

16. The method of claim 13 further comprising:

forming a longitudinal groove in said threaded stem;

forming a tab projecting radially into said compression ring opening such that it is alignable with said threaded stem groove; and engaging said threaded stem groove with said compression ring tab, such that, when said clamp nut is engaged on said neck portion of said threaded stem, rotation of said threaded stem relative to said compression ring is prevented and axial movement of said threaded stem through said opening of said compression ring is permitted.

17. A corporation stop for use with a standard drilling and tapping machine for blind side sealing of an opening provided in an external sidewall of a longitudinally extending conduit of the type lined with a synthetic liner also having a concentric opening, the corporation stop comprising:

a threaded stem having an enlarged, conical head portion, a neck portion of reduced size, and engagement means;

a resilient sleeve member coaxially surrounding the neck portion of the stem, the sleeve member having an upper end and having a lower end adapted to accommodate the enlarged, conical head portion of the threaded stem;

a compression ring having an upper side, a lower side, an outer edge having at least one notch formed radially therein, and an opening that is alignable with the opening provided in the external sidewall of the conduit and in the liner, the inner edge of the opening having engagement means, the lower side of the compression ring having a sleeve receiving recess of a diameter greater than that of said opening in said compression ring, said diameter of said recess being selectively sized to receive the upper end of said resilient sleeve member;

a clamp nut engageable with the neck portion of said threaded stem; and a saddle member for stabilizing said standard drilling and tapping machine on said external sidewall of said conduit about said opening, said saddle member having an opening shaped to receive said compression ring within said saddle member opening, said saddle member opening having an inner edge with at least one tab projecting radially from said inner edge and shaped to engage said at least one notch in said compression ring;

wherein, when said clamp nut is engaged with the neck portion of the threaded stem, said compression ring is forced against said resilient sleeve member (1) for forcibly moving the upper end of said resilient sleeve member within said sleeve receiving recess of said compression ring to form an external seal between the compression ring and the external sidewall of the conduit, and (2) for forcibly moving the lower end of said resilient sleeve member over the enlarged, conical head portion of the threaded stem to thereby expand the lower end of said sleeve member and form an internal seal with the opening in said lined conduit, and said at least one saddle member tab engages said at least one notch in said compression ring for preventing rotation of said compression ring relative to said saddle member as said clamp nut is engaged on said neck portion of said threaded stem.

18. The corporation stop of claim 17, further comprising a key;

wherein each of said threaded stem engagement means and said compression ring engagement means comprises a longitudinal keyway alignable with each other; and wherein said key is inserted into both said threaded stem keyway and said compression ring opening keyway when said threaded stem keyway and said compression ring opening keyway are aligned, for preventing rotation of said threaded stem relative to said compression ring when said clamp nut is engaged on said neck portion of said threaded stem.

19. The corporation stop of claim 17, wherein said threaded stem engagement means comprises a longitudinal groove formed therein and a and said compression ring engagement means comprises a tab formed therein projecting radially into said compression ring opening that is alignable with said groove formed in said threaded stem; and wherein said compression ring tab engages said longitudinal groove in said threaded stem for preventing rotation of said threaded stem relative to said compression ring and for allowing axial movement of said threaded stem through said opening of said compression ring when said clamp nut is engaged on said neck portion of said threaded stem.

20. The corporation stop of claim 17, further comprising insulating means between said compression ring and said external sidewall of said conduit for electrically insulating an electrical service line connected to the drilling and tapping machine from the conduit.

* * * * *